United States Patent [19]

Blankenship

[11] 3,946,970
[45] Mar. 30, 1976

[54] GYROSCOPICALLY STABILIZED, VERTICAL TAKEOFF AND LANDING AIRCRAFT

[76] Inventor: Ben F. Blankenship, 2681 Leix Way, South San Francisco, Calif. 94080

[22] Filed: Dec. 16, 1974

[21] Appl. No.: 532,914

[52] U.S. Cl............................................. 244/23 C
[51] Int. Cl.².................................... B64C 29/00
[58] Field of Search............ 244/12 C, 23 C, 17.11, 244/12 R, 23 R, 7 R, 12 D, 23 D, 12 A, 58; 46/74 D, 75

[56] References Cited
UNITED STATES PATENTS

| 3,191,316 | 6/1965 | Dryden | 244/23 C |
| 3,199,809 | 8/1965 | Modesti | 244/23 C |
| 3,215,366 | 11/1965 | Stephens | 244/7 R |
| 3,442,469 | 5/1969 | Davis | 244/23 C |
| 3,472,029 | 10/1969 | Colley | 244/58 |
| 3,514,053 | 5/1970 | McGuinness | 244/23 C |
| 3,612,445 | 10/1971 | Phillips | 244/23 C |
| 3,640,489 | 2/1972 | Jaeger | 244/23 C |

FOREIGN PATENTS OR APPLICATIONS

| 1,288,924 | 2/1969 | Germany | 244/23 C |
| 700,293 | 11/1953 | United Kingdom | 244/23 C |
| 533,751 | 9/1955 | Italy | 244/12 C |
| 1,528,122 | 6/1968 | France | 244/23 C |

*Primary Examiner*—Trygve M. Blix
*Assistant Examiner*—Galen L. Barefoot

[57] ABSTRACT

An aircraft in which a concavo-convex disc carries a hub at its center. An engine carried by the hub provides vertical lift for the aircraft. The aircraft is stabilized by the rotation of the disc relative to the hub. This rotation is induced by a plurality of nozzles carried by disc through which a portion of the engine exhaust passes.

8 Claims, 14 Drawing Figures

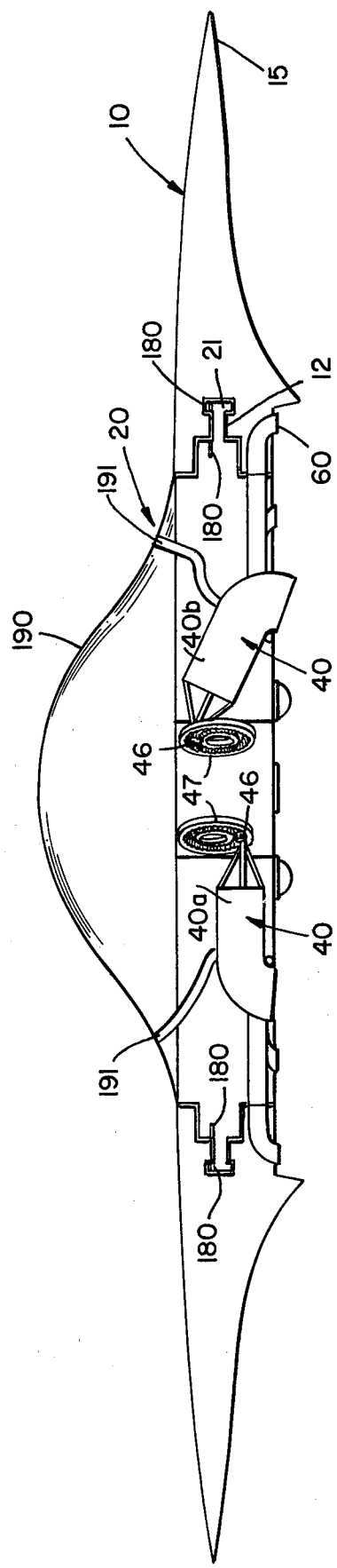
FIG_1

FIG_2
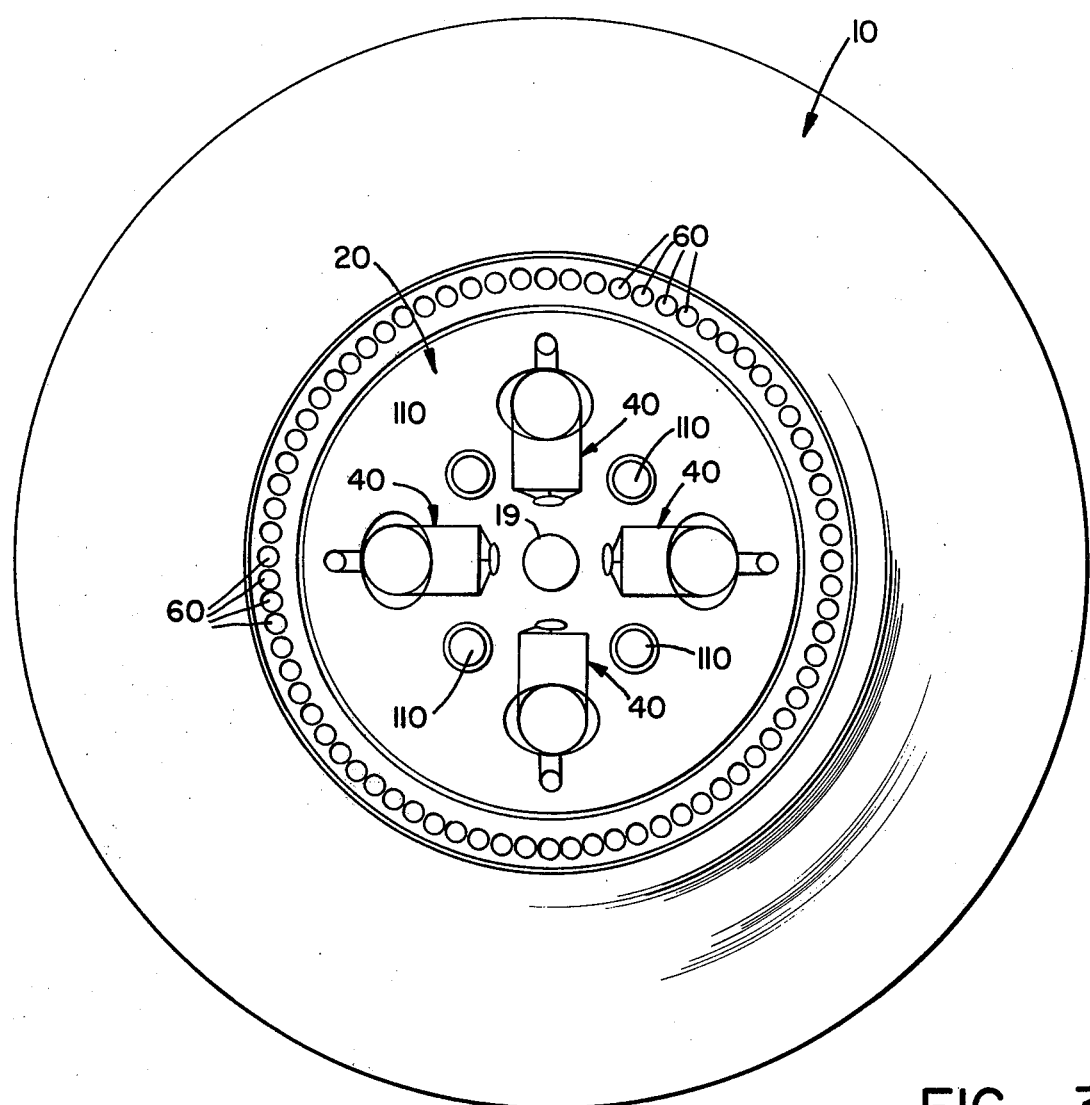
FIG_3
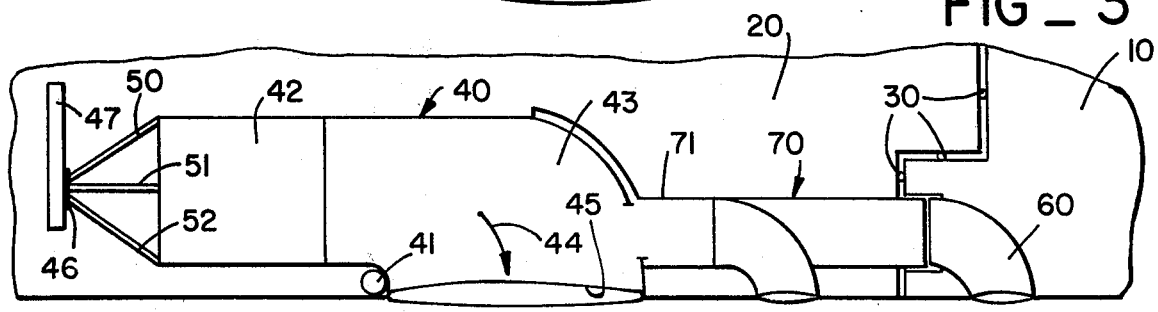

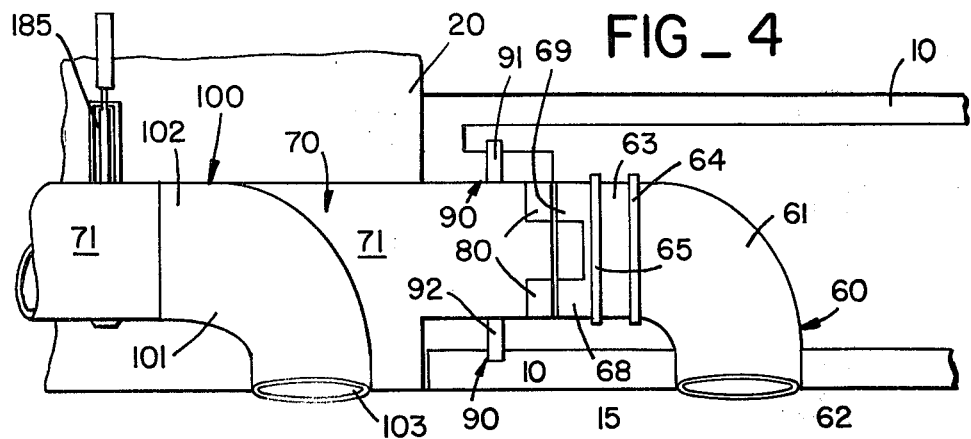
FIG_4
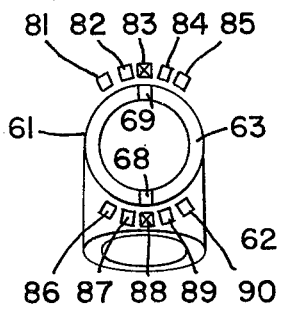
FIG_5A   FIG_5B   FIG_5C
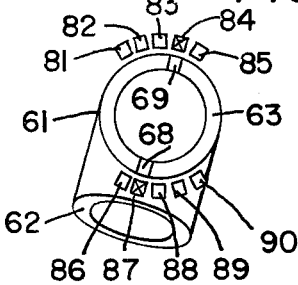
FIG_5D   FIG_5E
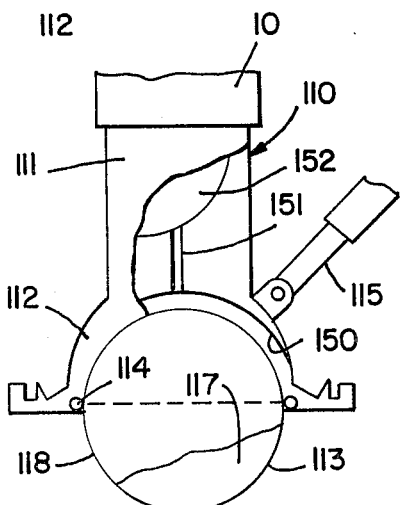
FIG_6
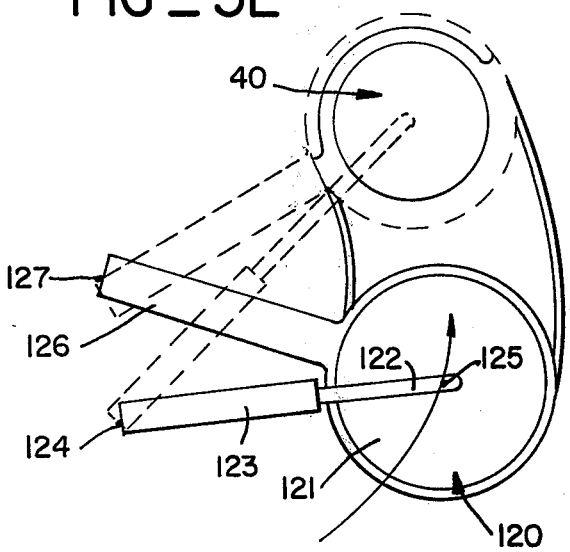
FIG_7

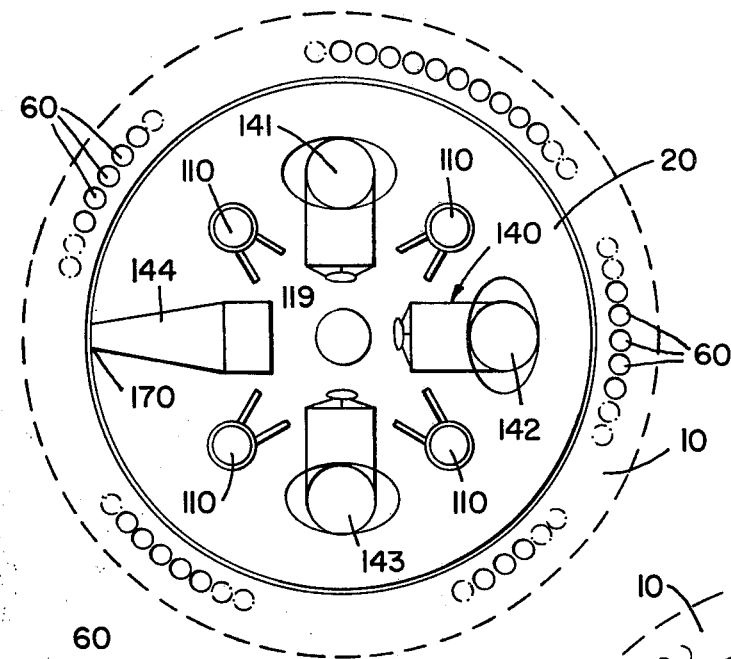
FIG_8
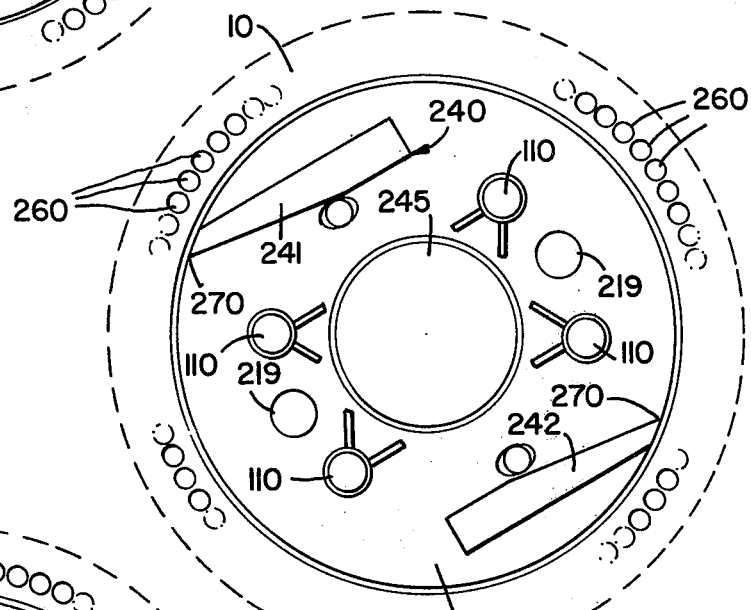
FIG_9
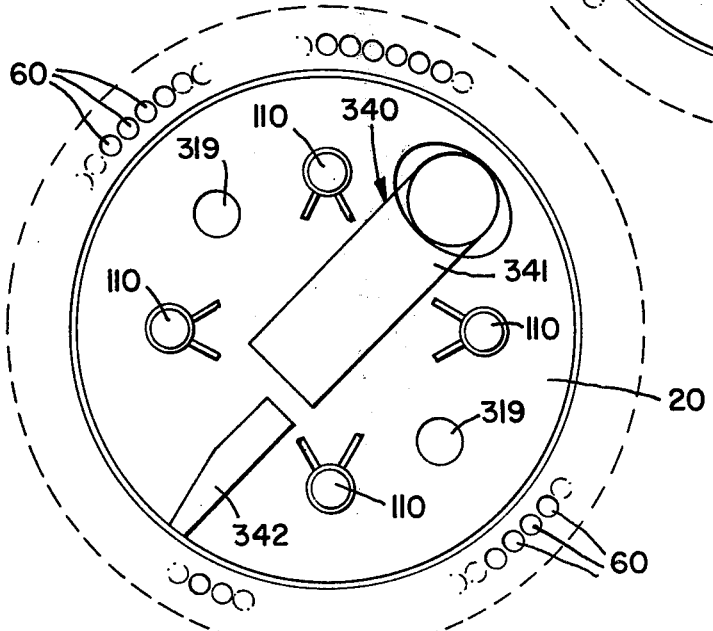
FIG_10

GYROSCOPICALLY STABILIZED, VERTICAL TAKEOFF AND LANDING AIRCRAFT

This invention relates generally to aircraft and more specifically to a gyroscopically-stabilized vertical takeoff and landing aircraft.

It is known in the prior art to provide apparatus which combines the Frisbee flight principle (as generally described in U.S. Pat. No. 3,359,678) with vertical thrust means to deliver military illumination flares. This combination is shown in the American Institute of Aeronautics and Astronautics Paper No. 72-982 dated Sept. 11, 1972. This prior art does not teach an aircraft in which the thrust means is used to induce rotation of the disc.

The instant invention provides an aircraft which combines the Frisbee flight principle with rocket or jet-powered vertical thrust means wherein the vertical thrust means is used to induce rotation of the disc as well as lift or separate thrust means is provided to induce rotation.

A primary object of this invention is to provide an aircraft taking advantage of the trajectorial lift found in the spin effect for vertical takeoffs and landings as well as hovering, rapid acceleration and extreme maneuverability.

A further object of this invention is to provide an aircraft combining the Frisbee principle of flight with conventional vertical thrust means.

A further object of this invention is to provide an aircraft in which conventional vertical thrust means is used to induce rotation of a disc forming a portion of the air foil, thereby inducing gyroscopic stabilization of the aircraft.

A further object of this invention is to provide an aircraft power plant which is gyroscopically stabilized.

Further objects and advantages of the invention will become apparent from the following description of a preferred embodiment and the drawings wherein:

FIG. 1 is an elevational front view, in section, of the aircraft;

FIG. 2 is an bottom view of the aircraft;

FIG. 3 is an elevational view, in section, of a portion of the aircraft;

FIG. 4 is an elevational view, in section, of a portion of the aircraft;

FIGS. 5a, 5b, 5c, 5d, and 5e are schematic representations of a portion of the invention;

FIG. 6 is a front elevational view, partially in section of a portion of the landing gear;

FIG. 7 is a schematic representation of the operation of a portion of the invention;

FIG. 8 is a bottom view of an alternate form of the invention;

FIG. 9 is a bottom view of yet another form of the invention; and

FIG. 10 is a bottom view of still another embodiment of the invention.

Referring to FIG. 1, a circular disc 10 of concavo-convex cross section is provided having a circular opening 11 at its center.

A hub 20 is disposed in a circular opening 11 of disc 10. Hub 20 has a T-shaped flange 21 extending around its periphery. Disc 10 has a U-shaped edge 12 which engages flange 21. Bearing means 30, shown best in FIG. 3, comprising ball bearings or other suitable bearings are provided between flange 21 and the U-shaped portion 12 of disc 10.

Hub 20 carries thrust means 40. Thrust means 40 may be a rocket motor or a jet engine. Thrust means 40 is mounted on a swivel 41. Thrust means 40 rotates about the axis of swivel 41 as described below for the purpose of maneuvering the aircraft.

As best shown in FIG. 3, thrust means 40 comprises a combustion chamber 42 and a thrust chamber 43. The main thrust of the engine is directed along the path of the arrow 44 by the downwardly extending mouth 45. Thrust means 40 may be articulated about the axis of swivel 41 by the relative motion of a pinion gear 46 against a ring gear 47. Pinion gear 46 is connected to thrust means 40 by struts 50, 51 and 52. FIG. 1 shows engines 40a and 40b articulated such that their output thrusts are parallel but inclined from the vertical to cause forward motion of the aircraft.

A payload carrying compartment 190 is provided on hub 20 and houses the various control mechanisms to operate the aircraft. Air intake 191 is provided in hub 20 connecting thrust means 40 to the atmosphere. Air intake 191 is not necessary when rocket engines are used as thrust means 40.

Referring to FIG. 2, four separate thrust means 40, mounted on hub 20 90° apart are utilized to provide power for the aircraft.

The flight of the aircraft is stabilized by the rotation of disc 10 relative to hub 20. Disc 10 is rotated by the force of the exhaust of thrust means 40 passing through nozzle means 60. A plurality of nozzle means 60 also provides a portion of the vertical thrust. Nozzle means 60 extend through the lower surface 15 of disc 10. At least two of the plurality of nozzle means 60 are oriented in a direction to induce rotation of disc 10 as a portion of the exhaust fluid from thrust means 40 passes through them. By orienting nozzle means 60 in a direction such that the output jet of the nozzle contains a component in a direction tangential to the circular periphery of disc 10, the orientation will induce rotation of disc 10.

Diversion means 70 is provided to direct a portion of the exhaust of thrust means 40 through nozzle means 60. Diversion means 70 comprises a cylindrical tube or pipe 71 extending from thrust chamber 43 to nozzle means 60.

Referring to FIG. 4, the relation of nozzle means 60 to diversion means 70 is shown in greater detail. Nozzle means 60 comprises a tubular elbow 61 having an end 62 projecting through the surface 15 of the aircraft. The other end 63 of elbow 61 is rotatably carried in disc 10 by means of bearings 64 and 65.

Nozzle rotating means 80 are carried in diversion tube 71. Nozzle rotation means 80 comprise a plurality of electromagnets 81–90 as shown in FIGS. 5a through 5e.

Referring to FIGS. 5a through 5e, the viewer is looking into end 63 of nozzle means 60. Nozzle rotation means 80 have the effect of rotating the end 62 of nozzle means 60 relative to the surface 15 of the aircraft. Nozzle rotation means 80 comprises a plurality of electromagnets 81–90 which are carried in diversion line 71 in hub 20.

Elbow 61 is made of a non-ferrous material so as to be insensitive to electromagnets 81–90. Elbow 61 carries ferrous lobes 68 and 69 which are sensitive to the fields of electromagnets 81–90. As different pairs of electromagnets are actuated as shown in FIGS. 5a–5e, lobes 68 and 69 are attracted to the energized electromagnets and thereby rotate elbow 61 about the axis of diversion line or pipe 71. For example, in FIG. 5a when the opposed pair of electromagnets 83 and 88 are energized, lobes 68 and 69 rotate to positions adjacent electromagnets 83 and 88 as shown. In FIG. 5b when opposed electromagnets 85 and 86 are energized, lobes 69 and 68 are rotated to positions adjacent thereto. FIGS. 5c through 5e show the relative position of elbow 61 when the remaining pairs of electromagnets 81, 90;84, 87; and 82 and 89 are energized.

In order to prevent excessive loss of pressure between the diversion line 71 and nozzle means 60, sealing means 90 is provided between disc 10 and diversion line 71. Sealing means 90 comprises a pair of metallic rings 91 and 92 which are seated in appropriate recesses formed in disc 10.

Anti-creep booster means 100 is provided for the purpose of stabilizing hub 20 and preventing hub 20 from rotating with disc 10. Anti-creep means 100 comprises elbow 101 which has an end 102 extending into and covering a portion of diversion line 71 and an end 103 extending through surface 15 of disc 10. Elbow 101 is mechanically rotatable about the longitudinal axis of diversion line 71 whereby end 103 is rotated and thereby creates the required counter-thrust to prevent hub 20 from rotating as well as providing booster thrust for maneuvers.

FIG. 6 shows the landing gear 110 utilized in the aircraft. Landing gear 110 comprises a hydraulic telescoping shaft 111 which terminates in an oil-filled recess 150 fed by fluid duct 151. Hydraulic fluid or oil is stored in reservoir 152 internally of shaft 111. A hemispherical socket 112 is carried at the downward end of shaft 111. A deformable, spherical shock absorbing pad 113 is carried in socket 112. Pad 113 covers a sphere 117 of honeycombed aluminum. Pad 113 is held in place by ring 114. Shaft 111 is supported laterally by hydraulic strut 115.

FIG. 7 shows a cover means 120 which is used to cover the exhaust ports of thrust means 40 in emergency situations such as an emergency landing on water. Cover 120 is normally carried in the position shown in FIG. 7. For an emergency landing on water cover 245 is also utilized at the center of hub 20 which directs its thrust downwardly to provide lift for the aircraft.

In FIG. 10 thrust means 340 includes a large single engine 341 which directs its thrust downwardly and a secondary smaller engine 342 which provides thrust laterally for rotation of disc 10.

Entrance and exit hatchways are also provided. In FIG. 2, hatchway 19 is positioned in the center of hub 20. Hatchway 119 in FIG. 8 is also located in the center of hub 20. Hatchways 219 and 319 in FIGS. 9 and 10 are disposed on opposite sides of the center of hub 20.

Referring to FIG. 1, disc brakes 180 are positioned on hub 20 to grasp the U-shaped portion 12 of disc 10 to stop rotation thereof when the aircraft is on the ground.

The aircraft is designed to withstand emergency landings on water. FIG. 4 shows a cam 185 which is hydraulically operated and which seals off nozzle means 60 and the anti-creep booster 100 by closing off diversion line 71 to prevent water from flooding the aircraft. In addition, cover means 120 seals off thrust means 40 to prevent flooding of the engines.

I claim:
1. In a gyroscopically stabilized aircraft having a circular disc of concavo-convex cross-section with a circular opening at its center, a hub disposed in said circular opening, bearing means disposed between said disc and said hub to facilitate relative rotation between said disc and said hub, and thrust means carried by said hub, the improvement comprising:
 a plurality of rotatable nozzle means extending through the surface of said disc for inducing rotation of said disc,
 diversion means for directing a portion of the exhaust from said thrust means through said nozzle means, and
 a plurality of opposed pairs of electromagnets mounted in said diversion means and a pair of ferrous lobes carried by said nozzle means whereby said nozzle means is rotated by the selective energizing of a pair of opposed electromagnets which